US008315348B2

(12) United States Patent
Christensen et al.

(10) Patent No.: US 8,315,348 B2
(45) Date of Patent: Nov. 20, 2012

(54) CLOCK EXTRACTION CIRCUIT FOR USE IN A LINEARLY EXPANDABLE BROADCAST ROUTER

(75) Inventors: Carl L. Christensen, South Jordan, UT (US); Lynn Howard Arbuckle, Bountiful, UT (US)

(73) Assignee: GVBB Holdings S.A.R.L., Luxembourg (LU)

( * ) Notice: Subject to any disclaimer, the term of this patent is extended or adjusted under 35 U.S.C. 154(b) by 1086 days.

(21) Appl. No.: 10/518,569

(22) PCT Filed: Jun. 20, 2003

(86) PCT No.: PCT/US03/19391
§ 371 (c)(1),
(2), (4) Date: Dec. 21, 2004

(87) PCT Pub. No.: WO04/002096
PCT Pub. Date: Dec. 31, 2003

(65) Prior Publication Data
US 2005/0243957 A1   Nov. 3, 2005

(51) Int. Cl.
*H04L 7/02* (2006.01)
(52) U.S. Cl. .................. 375/360; 375/242; 704/200
(58) Field of Classification Search .................. 375/360, 375/242; 398/49; 704/200
See application file for complete search history.

(56) References Cited

U.S. PATENT DOCUMENTS

| 5,404,362 | A | | 4/1995 | Meitner |
| 5,889,820 | A | | 3/1999 | Adams |
| 6,005,904 | A | * | 12/1999 | Knapp et al. .................. 375/376 |
| 6,137,778 | A | * | 10/2000 | Yoshida .................... 370/395.62 |
| 6,654,409 | B1 | * | 11/2003 | Scott et al. ..................... 375/220 |
| 6,757,302 | B1 | * | 6/2004 | Lydon et al. .................. 370/503 |
| 6,772,021 | B1 | * | 8/2004 | Fuller ............................. 700/94 |
| 7,295,578 | B1 | * | 11/2007 | Lyle et al. ..................... 370/503 |

FOREIGN PATENT DOCUMENTS

| WO | WO 98/16040 A1 | 4/1998 |
| WO | WO 01/78270 A2 | 10/2001 |
| WO | WO 02/23811 A2 | 3/2002 |
| WO | WO 02/23951 A2 | 3/2002 |

OTHER PUBLICATIONS

Search Report Dated Nov. 7, 2003.
Marco Angelici et al., New Architecture for an AES-EBU Digital Audio Receiver, IEEE Transactions on Consumer Electronics, Aug. 1997, pp. 694-698, vol. 43, No. 3, SGS Thomson Microelectronics—Agrate Brianza (MI), 20041 Italy.

* cited by examiner

*Primary Examiner* — Chieh M Fan
*Assistant Examiner* — Leila Malek
(74) *Attorney, Agent, or Firm* — Arent Fox LLP

(57) ABSTRACT

A method is described for extracting selected time information from a stream of serialized AES digital audio data. A first transition indicative of a first preamble of said stream of serialized AES digital audio data is detected and, upon detection of the transition, a time count initiated. A second transition indicative of a subsequent preamble of said serialized AES digital audio data is subsequently detected and the time count halted. The time separating the first and second transitions is then determined. The separation time, which preferably is determined in the form of a fast clock pulse count, is then transferred to a decoding logic circuit for use in decoding the stream of serialized AES digital audio data.

8 Claims, 4 Drawing Sheets

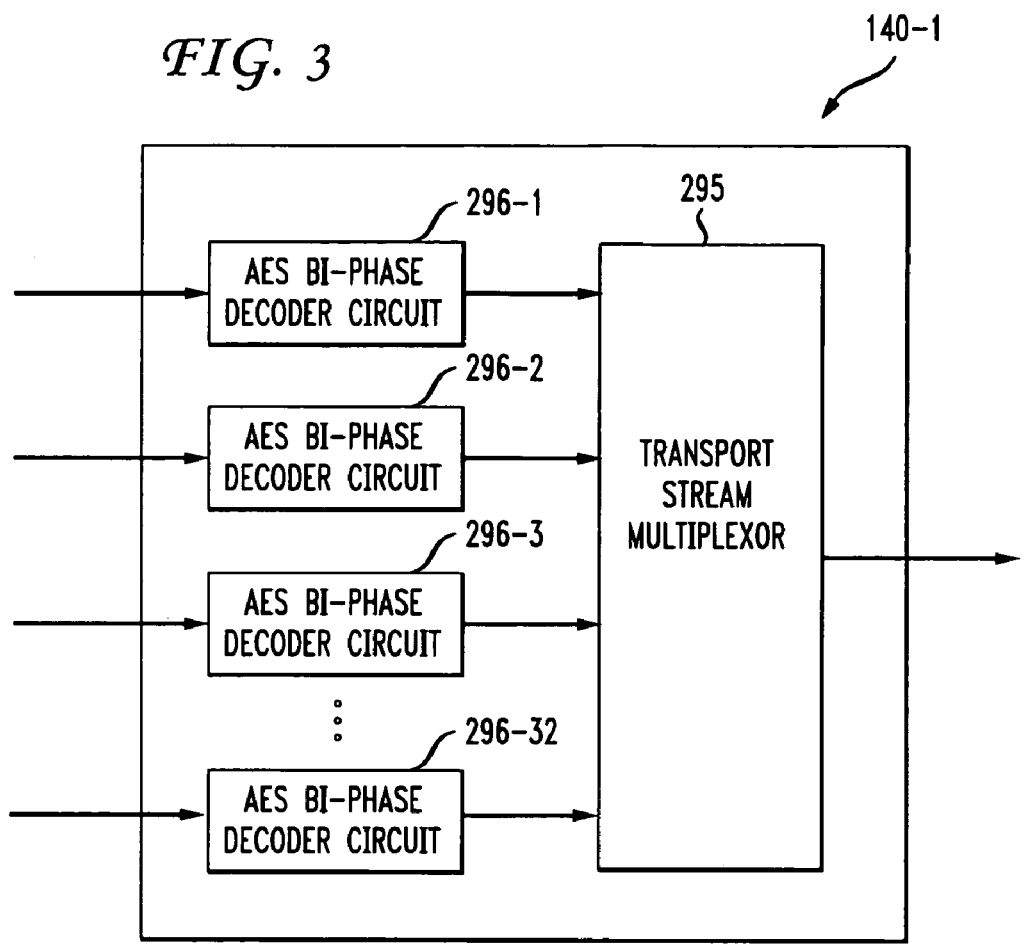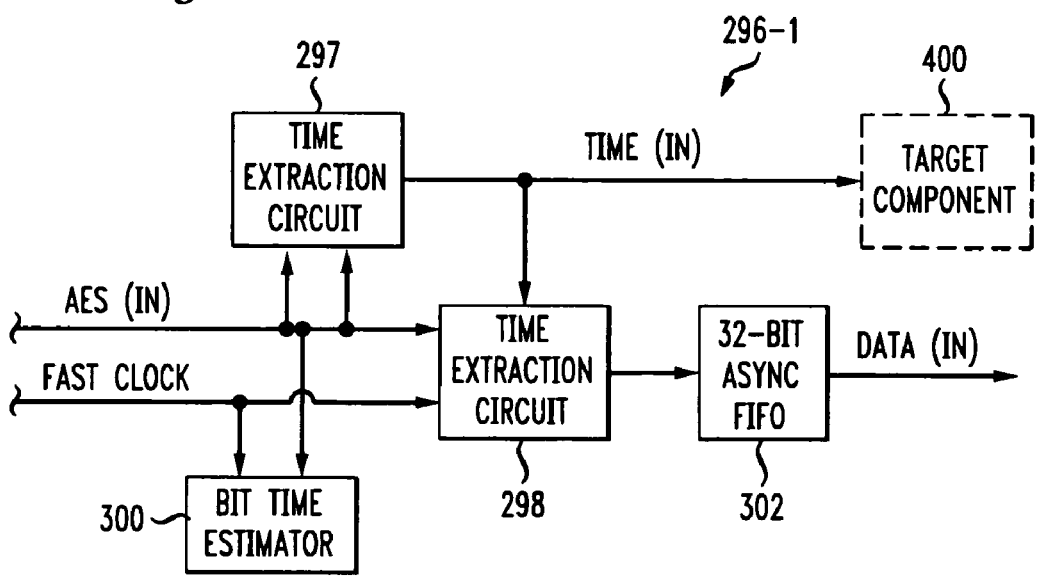

CLOCK EXTRACTION CIRCUIT FOR USE IN A LINEARLY EXPANDABLE BROADCAST ROUTER

CROSS REFERENCE

This application claims the benefit, under 35 U.S.C. §365 of International Application PCT/US03/19391, filed Jun. 20, 2003, which was published in accordance with PCT Article 21(2) on Dec. 31, 2003 in English and which claims the benefit of U.S. provisional patent application No. 60/390,346, filed Jun. 21, 2002.

FIELD OF THE INVENTION

The present invention relates to broadcast routers and, more particularly, to circuit for extracting selected time information, from a serialized stream of digital audio data passing through a decoder circuit of the broadcast router, for use by various components thereof.

BACKGROUND OF THE INVENTION

Traditionally, broadcast routers have incorporated serial digital audio decoders for extracting digital audio data words from a serialized stream of digital audio data. However, such serial digital audio decoders extract little, if any, timing information from the stream of digital audio data. For example, prior serial digital audio decoders which output some form of a "recovered clock" are known in the art. It would be quite useful if serial digital audio decoders were configured to extract other types of timing information from a received serialized stream of digital audio data. For example, it is contemplated that time information extracted from a received serialized stream of digital audio data by a serial digital audio decoder could be used by the serial digital audio decoder itself, for example, in the manner disclosed in co-pending U.S. patent application Ser. No. 10/519,000 and previously incorporated by reference, or by other components of the broadcast router. Heretofore, however, serial digital audio decoders have not been configured to extract such types of information. It is, therefore, the object of the invention to provide a serial digital audio decoder capable of extracting timing information from a received serialized stream of digital audio data.

SUMMARY OF THE INVENTION

The invention is directed to a method for extracting selected time information from a stream of serialized AES digital audio data. A first transition indicative of a first preamble of said stream of serialized AES digital audio data is detected and, upon detection of the transition, a time count initiated. A second transition indicative of a subsequent preamble of said serialized AES digital audio data is subsequently detected and the time count halted. The time separating the first and second transitions is then determined. The separation time, which preferably is determined in the form of a fast clock pulse count separating the first and second transitions, may be transferred to a decoding logic circuit for use in decoding the stream of serialized AES digital audio data. Alternately, the separation time, again preferably determined in the form of a fast clock pulse count separating the first and second transitions, may be transferred to an encoding logic circuit for use in encoding the stream of serialized AES digital audio data.

In another embodiment, the present invention is directed to a broadcast router which includes a decoder circuit and a target component coupled to the decoder circuit. The decoder circuit receives a stream of serialized AES digital audio data and, during the decoding thereof, the decoder circuit extracts time information from the stream of serialized AES digital audio. The decoder circuit then forwards the extracted time information to the target component where it is used, by the target component, during the execution of at least one function thereof. The extracted time information may also be used, by the decoder circuit itself, to decode the received stream of serialized AES digital audio data.

BRIEF DESCRIPTION OF THE DRAWINGS

FIG. 3 is an expanded block diagram of an AES input circuit of the first broadcast router component of FIG. 2;

FIG. 4 is an expanded block diagram of an AES bi-phase decoder circuit of the AES input circuit of FIG. 3.

DETAILED DESCRIPTION

Figure 1:
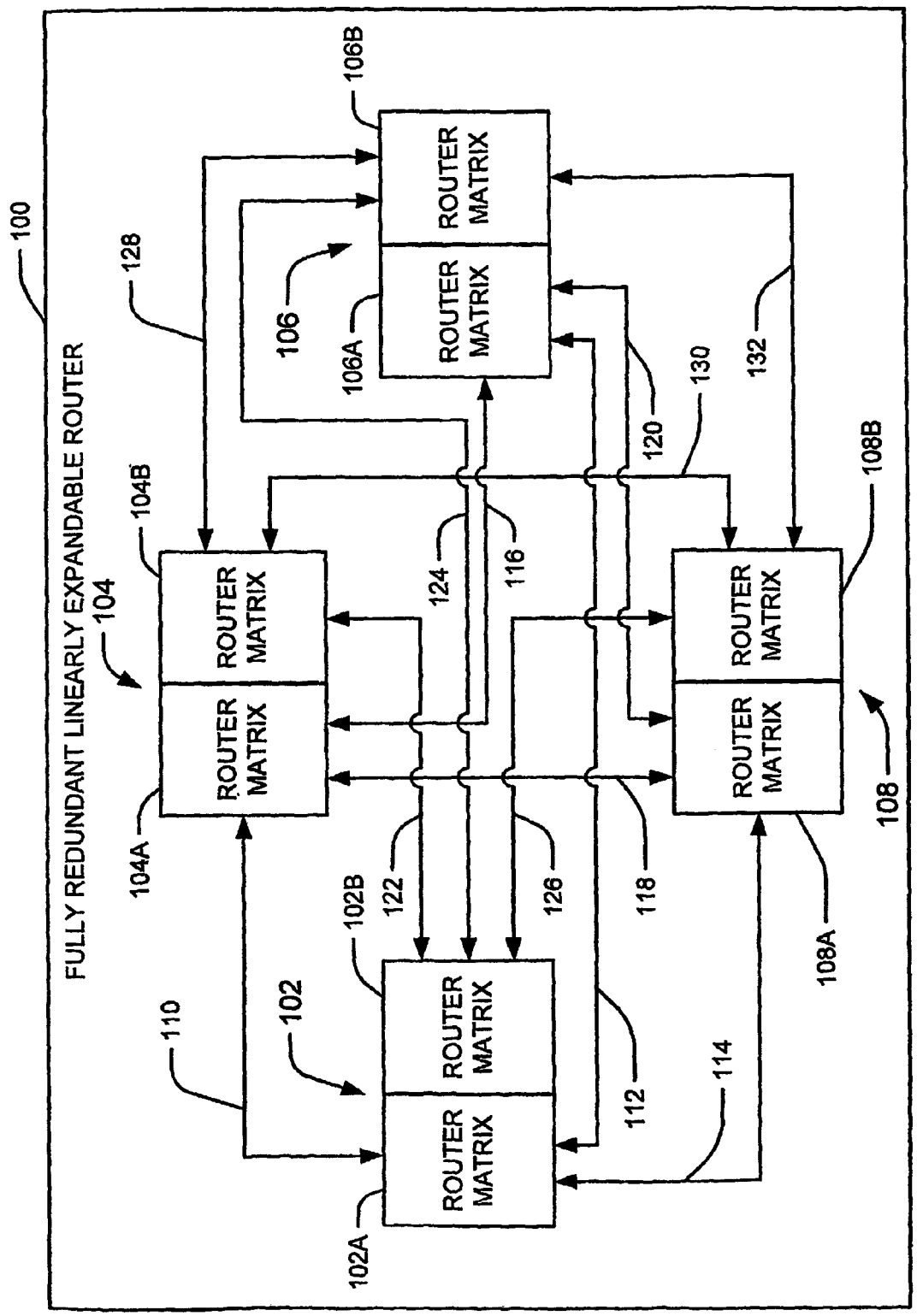
FIG. 1 is a block diagram of a fully redundant, linearly expandable broadcast router which incorporates a bi-phase decoder constructed in accordance with the teachings of the present invention.

Referring first to FIG. 1, a fully redundant, linearly expandable broadcast router 100 will now be described in greater detail. As may now be seen, the fully redundant, linearly expandable broadcast router 100 is comprised of plural broadcast router components coupled to one another to form the larger fully redundant linearly expandable broadcast router 100. Each broadcast router component is a discrete router device which includes first and second router matrices, the second router matrix being redundant of the first router matrix. Thus, each broadcast router has first and second routing engines, one for each of the first and second router matrices, each receiving, at an input side thereof, the same input digital audio data streams and placing, at an output side thereof, the same output digital audio data streams. As disclosed herein, each of the broadcast router components used to construct the fully redundant, linearly expandable broadcast router are N×M sized broadcast routers. However, it is fully contemplated that the fully redundant, linearly expandable broadcast router 100 could instead be constructed of broadcast router components of different sizes relative to one another.

As further disclosed herein, the fully redundant, linearly expandable broadcast router 100 is formed by coupling together first, second, third and fourth broadcast router components 102, 104, 106 and 108. Of course, the present disclosure of the fully redundant, linearly expandable broadcast router 100 as being formed of four broadcast router components is purely by way of example. Accordingly, it should be clearly understood that a fully redundant, linearly expandable broadcast router constructed in accordance with the teachings of the present invention may be formed using various other numbers of broadcast router components. The first, second, third and fourth broadcast router components 102, 104, 106 and 108 which, when fully connected in the manner disclosed herein, collectively form the fully redundant, linearly expandable broadcast router 100, may either be housed together in a common chassis as illustrated in FIG. 1 or, if desired, housed in separate chassis. While, as previously set forth, the broadcast router components 102, 104, 106 and 108 may have different sizes relative to one another or, in the alternative, may all have the same N×M size, one size that has proven suitable for the uses contemplated herein is 256×256. Furthermore, a suitable configuration for the fully redundant, linear expandable broadcast router 100 would be to couple five broadcast router components, each sized at 256×256, thereby resulting in a 1,280×1,280 broadcast router.

The first broadcast router component 102 is comprised of a first router matrix 102a and a second (or "redundant") router matrix 102b used to replace the first router matrix 102a in the event of a failure thereof. Similarly, each one of the second, third and fourth broadcast router components 104, 106, and 108 of the fully redundant, linearly expandable broadcast router 100 are comprised of a first router matrix 104a, 106a and 108a, respectively, and a second (or "redundant") router matrix 104b, 106b and 108b, respectively, used to replace the first router matrix 104a, 106a and 108a, respectively, in the event of a failure thereof. Of course, the designation of the second router matrices 102b, 104b, 106b and 108b as a redundant matrix for use as a backup for the first router matrices 102a, 104a, 106a and 108a, respectively, in the event of a failure thereof is purely arbitrary and it is fully contemplated that either one of a router matrix pair residing within a broadcast router component may act as a backup for the other of the router matrix pair residing within that broadcast router component.

As may be further seen in FIG. 1, the first router matrix 102a of the first broadcast router component 102, the first router matrix 104a of the second broadcast router component 104, the first router matrix 106a of the third broadcast router component 106 and the first router matrix 108a of the fourth broadcast router component 108 are coupled together in a first arrangement of router matrices which conforms to a fully connected topology. Similarly, the second router matrix 102b of the first broadcast router component 102, the second router matrix 104b of the second broadcast router component 104, the second router matrix 106b of the third broadcast router component 106 and the second router matrix 108b of the fourth broadcast router component 108 are coupled together in a second arrangement which, like the first arrangement, conforms to a fully connected topology. In a fully connected topology, each router matrix of an arrangement of router matrices is coupled, by a discrete link, to each and every other router matrix forming part of the arrangement of router matrices.

Thus, for the first arrangement of router matrices, first, second and third bi-directional links 110, 112 and 114 couples the first router matrix 102a of the first broadcast router component 102 to the first router matrix 104a of the second broadcast router component 104, the first router matrix 106a of the third broadcast router component 106 and the first router matrix 108a of the fourth broadcast router component 108, respectively. Additionally, fourth and fifth bi-directional links 116 and 118 couple the first router matrix 104a of the second broadcast router component 104 to the first router matrix 106a of the third broadcast router component 106 and the first router matrix 108a of the fourth broadcast router component 108, respectively. Finally, a sixth bi-directional link 120 couples the first router matrix 106a of the third broadcast router component 106 to the first router matrix 108a of the fourth broadcast router component 108.

Similarly, for the second arrangement of router matrices, first, second and third bi-directional links 122, 124 and 126 couples the second router matrix 102b of the first broadcast router component 102 to the second router matrix 104b of the second broadcast router component 104, the second router matrix 106b of the third broadcast router component 106 and the second router matrix 108b of the fourth broadcast router component 108, respectively. Additionally, fourth and fifth bi-directional links 128 and 130 couple the second router matrix 104b of the second broadcast router component 104 to the second router matrix 106b of the third broadcast router component 106 and the second router matrix 108b of the fourth broadcast router component 108, respectively. Finally, a sixth bi-directional link 132 couples the second router matrix 106b of the third broadcast router component 106 to the second router matrix 108b of the fourth broadcast router component 108. Variously, the bi-directional links 110 through 120 may be formed of copper wire, optical fiber or another transmission medium deemed suitable for the exchange of digital signals. Of course, rather than the single bi-directional links between pairs of broadcast router components illustrated in FIG. 1, in an alternate embodiment of the invention, it is contemplated that the pairs of broadcast router components may instead be coupled together by first and second uni-directional links. Such an alternate configuration is illustrated in FIG. 2.

The broadcast router components 102, 104, 106 and 108 will now be described in greater detail. FIG. 2 shows the first broadcast router component 102. The second, third and fourth broadcast router components 104, 106 and 108, on the other hand, are similarly configured to the first broadcast router component 102 and need not be described in greater detail. Of course, it should be clearly understood that certain components of the foregoing description of the first broadcast router component 102, as well as the second, third and fourth broadcast routers 104, 106 and 108 have been simplified for brevity of description. It is noted, however, that further details thereof may be found by reference to co-pending U.S. patent application Ser. No. 10/518,212 and previously incorporated by reference.

Figure 2:
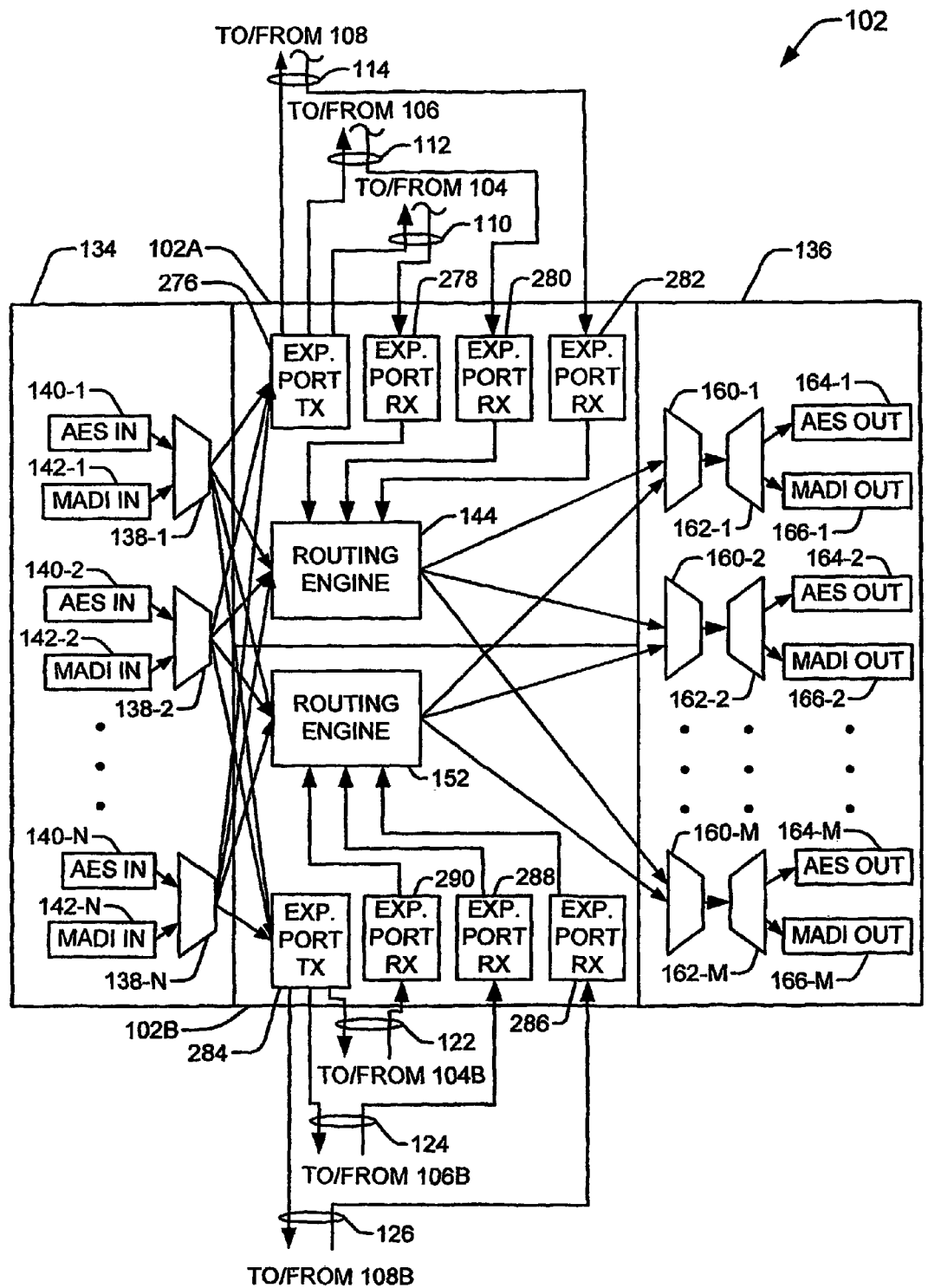
FIG. 2 is an expanded block diagram of a first broadcast router component of the fully redundant, linearly expandable broadcast router of FIG. 1.

As may be seen in FIG. 2, the broadcast router 102 includes N selectors 138-1 through 138-N arranged such that the output of each one of the selectors provides one of N transport streams to an input side of each one of the router matrices 102a, 102b of the first broadcast router component 102. As disclosed herein, each one of the selectors 138-1 through 138-N is a first 2:1 selector circuit having, as a first input thereto, a first transport stream built by an Audio Engineering Society ("AES") input circuit 140-1 through 140-N, respectively, and, as a second input thereto, a second transport stream built from a decoded digital audio data stream conforming to the multichannel digital audio ("MADI") standard by a MADI input circuit 142-1 through 142-N, respectively. Each one of the first selector circuits 138-1 through 138-N further includes a control input (not shown) for selecting between the two transport streams.

The selected transport stream output each one of the first selector circuits 138-1 through 138-N is fed to an input side of a routing engine 144, a transmitting (or "TX") expansion port 276, a first receiving (or "RX") expansion port 278, a second receiving expansion port 280 and a third receiving expansion port 282 of the first router matrix 102a. By the term "transmitting" expansion port, it is intended to refer to an expansion port from which data is transmitted to a selected destination. Similarly, by the term "receiving" expansion port, it is intended to refer to an expansion port which receives data from a destination. In a broad sense, the transmitting expansion port 276 of the first router matrix 102a is comprised of a memory subsystem in which the transport streams received from the first selector circuits 138-1 through 138-N of the first broadcast router component 102 are buffered before transfer to plural destinations and a processor subsystem for controlling the transfer of the transport streams received from the first selector circuits 138-1 through 138-N to a receiving expansion port of the first router matrix 104a of the second broadcast router component 104, the first router matrix 106a of the third broadcast router component 106 and the first router matrix 108a of the fourth broadcast router component 108. Conversely, each one of the first, second and third expansion ports 278, 280 and 282 of the first router matrix 102a are, in a broad sense, comprised of a memory subsystem in which input transport streams received from a transmitting expansion port of the first router matrix of another broadcast router component may be buffered before transfer to their final destination and a processor subsystem for controlling the transfer of the input transport streams received from the transmitting expansion port of the first router matrix of the other broadcast router component to inputs of the routing engine 144 of the first router matrix 102a of the first broadcast router component 102.

From the first selector circuits 138-1 through 138-N, transport streams 1 through N containing information extracted from AES input 1-32N and/or MADI inputs 1-N are transmitted to the routing engine 144 and the transmission expansion port 276. From the transmission expansion port 276, input transport streams 1 through N are forwarded to the first router matrix 104a of the second broadcast router component 104 over the link 110, to the first router matrix 106a of the third broadcast router 106 over the link 112 and to the first router matrix 108a of the fourth broadcast router 108 over the link 114. In return, input transport streams N+1 through 2N are transmitted, from the transmission expansion port of the first router matrix 104a of the second broadcast router component 104, to the first receiver expansion port 278 over the link 110; input transport streams 2N+1 through 3N are transmitted, from the transmission expansion port of the first router matrix 106a of the third broadcast router component 106, to the second receiver expansion port 280 over the link 112; and input transport streams 3N+1 through 4N are transmitted, from the transmission expansion port of the first router matrix 108a of the fourth broadcast router component 108, to the third receiver expansion port 282 over the link 114. Finally, input transport streams N+1 through 2N, 2N+1 through 3N and 3N+1 through 4N are input, by the first, second and third receiver expansion ports 278, 280 and 282, respectively, the routing engine 144.

As previously set forth, the first and second router matrices 102a and 102b are redundant matrices relative to one another. To function in this manner, routing engine 152 of the second router matrix 102b must have the same set of input transport streams as the routing engine 144. Accordingly, in a fashion like that hereinabove described, the selected transport streams output each one of the first selector circuits 138-1 through 138-N are also fed to an input side of the routing engine 152 as well as a transmitting port 284. Similarly, the transport streams fed to the first receiving expansion port 278, the second receiving expansion port 290 and the third receiving expansion port 282 are also fed to a first receiving expansion ports 286, a second receiving expansion port 288 and a third receiving expansion port 290, respectively, of the second router matrix 102b. In a broad sense, the transmitting expansion port 284 of the second router matrix 102b is comprised of a memory subsystem in which the transport streams received from the first selector circuits 138-1 through 138-N of the first broadcast router component 102 are buffered before transfer to plural destinations and a processor subsystem for controlling the transfer of the transport streams received from the selector circuits 138-1 through 138-N to a receiving expansion port of the second router matrix 104b of the second broadcast router component 104, the second router matrix 106b of the third broadcast router component 106 and the second router matrix 108b of the fourth broadcast router component 108. Conversely, each one of the first, second and third expansion ports 286, 288 and 290 of the second router matrix 102b are, in a broad sense, comprised of a memory subsystem in which the transport streams received from a transmitting expansion port of the first router matrix of another broadcast router component may be buffered before transfer to their final destination and a processor subsystem for controlling the transfer of the transport streams received from the transmitting expansion port of the first router matrix of the other broadcast router component to inputs of the routing engine 152 of the second router matrix 102b of the first broadcast router component 102.

From the first selector circuits 138-1 through 138-N, input transport streams 1 through N are transmitted to the routing engine 152 and the transmission expansion port 284. From the transmission expansion port 284, input transport streams 1 through N are forwarded to the second router matrix 104b of the second broadcast router component 104 over the link 122, to the second router matrix 106b of the third broadcast router 106 over the link 124 and to the second router matrix 108b of the fourth broadcast router 108 over the link 126. In return, input transport streams N+1 through 2N are transmitted, from the transmission expansion port of the second router matrix 104b of the second broadcast router component 104, to the third receiver expansion port 290 over the link 122; input transport streams 2N+1 through 3N are transmitted, from the transmission expansion port of the second router matrix 106b of the third broadcast router component 106, to the second receiver expansion port 288 over the link 124; and input transport streams 3N+1 through 4N are transmitted, from the transmission expansion port of the second router matrix 108b of the fourth broadcast router component 108, to the first receiver expansion port 288 over the link 126. From the third, second and first receiver expansion ports 290, 288 and 286, the input transport streams N+1 through 2N, 2N+1 through 3N and 3N+1 through 4N are transmitted, by the third, second and first receiver expansion ports 290, 288 and 286, respectively, to the routing engine 154.

Residing within the routing engine 144 of the first router matrix 102a is switching means for assigning any one of the 4N AES streams received as inputs to the routing engine 144 to any one of the M output lines of the routing engine 144. Variously, it is contemplated that the routing engine 144 may be embodied in software, for example, as a series of instructions; hardware, for example, as a series of logic circuits; or a combination thereof. Similarly, residing within the routing engine 152 of the second router matrix 102b is switching means for assigning any one of the 4N input AES streams received as inputs to the routing engine 152 to any one of the M output lines of the routing engine 152. Again, it is contemplated that the routing engine 152 may be variously embodied in software, hardware or a combination thereof. Each one of the 1 through M AES streams output the routing engines 144 and 152 of the first and second routing matrices 102a and 102b, respectively, of the first broadcast router component 102 are propagated to a corresponding one of second selector circuits 160-1 through 160-M. The second selector circuits 160-1 through 160-M collectively determine whether the 1 through M AES streams output the routing engine 144 of the first routing matrix 102a or the 1 through M AES streams output the routing engine 152 of the second routing matrix 102b shall be the output of the first broadcast router component 102. Each one of the second selector circuits 160-1 through 160-M share a common control input (not shown) for selecting whether the AES streams output the routing engine 144 or the AES streams output the routing engine 152 shall be passed by the second selector circuits 160-1 through 160-M.

From the second selector circuits 160-1 through 160-M, the selected AES streams are propagated to a respective one of information duplication circuits 162-1 through 162-M. In turn, the information duplication circuits 162-1 through 162-M pass the received AES streams to either the AES output circuits 164-1 through 164-M or the MADI output circuits 166-1 through 166-M for encoding and output from the first broadcast router component 102. Similarly, if the received information streams were MADI streams, they, too, could be passed to either the AES output circuits 164-1 through 164-M or the MADI output circuits 166-1 through 166-M for encoding and output from the first broadcast router component 102.

Referring next to FIG. 3, the AES input circuits 140-1 through 140-N will now be described in greater detail. FIG. 3 shows the AES input circuit 140-1. The remaining AES input circuits, specifically, the AES input circuits 140-2 through 140-N are similarly configured to the AES input circuit 140-1 and need not be described in greater detail. As may now be seen, the AES input circuit 140-1 includes AES bi-phase decoder circuits 296-1 through 296-32 and a transport stream multiplexer 295. Input to each one of the AES bi-phase decoder circuits 296-1 through 296-32 is a respective input digital audio data stream, conforming to the AES-3 standard, and originating at a signal source (not shown). As will be more fully described below, the AES bi-phase decoder circuits 296-1 through 296-32 decodes the respective input digital audio data stream input thereto. The resulting 32 decoded input digital audio data streams produced by the AES bi-phase decoder circuits 296-1 through 296-32 are input the transport stream multiplexer 295 which builds, from the 32 decoded input digital audio data streams, an input transport stream which is passed to the selector circuit 138-1.

The AES bi-phase decoder circuits 296-1 through 296-32 will now be described in greater detail. FIG. 4 shows the AES bi-phase decoder circuit 296-1. The remaining AES bi-phase decoder circuits, specifically, the AES bi-phase decoder circuits 296-2 through 296-32 are similarly configured to the AES bi-phase decoder circuit 296-1 and need not be described in greater detail. As will be more fully described below, the AES bi-phase decoder 296-1 works by using a fast clock to sample an incoming data stream, here, the AES serialized digital audio data stream. In order to decode the AES serialized digital audio data stream, the AES bi-phase decoder 296-1 also requires an estimated bit time. As used herein, the term "fast clock" refers to a clock having a frequency of at least twenty times faster than the frequency of the incoming AES digital audio data stream. The term "bit time", on the other hand, refers to the number of fast clocks that will occur during a typical bit of the incoming AES digital audio data stream. As disclosed herein, it is contemplated that the AES bi-phase decoder 296-1 may operate in two modes. In the first mode, the bit time is user-selected for direct input to the logic circuit 298 while, in the second mode, the bit time is automatically generated from the incoming serialized digital audio data stream.

As may be seen in FIG. 4, the AES bi-phase decoder 296-1 is comprised of a time extraction circuit 297, a decoding logic circuit 298, a bit time estimator 300 and an appropriately sized data store, for example, a 32-bit wide asynchronous first-in-first-out ("FIFO") memory 302. The AES bi-phase decoder 296-1 receives the serialized digital audio data stream of AES data from the AES input 140-1. Within the AES bi-phase decoder 296-1, the AES serialized digital audio data stream is then routed to each of the time extraction circuit 297, the decoding logic circuit 298 and the bit time estimator 300. The time extraction circuit 297 extracts certain time information, specifically, the number of fast clocks separating successive preambles from the second serialized digital audio data stream. The time extraction circuit 297 then passes the extracted time information to the decoding logic circuit 298 for decoding of the AES serialized digital audio data stream. In addition to passing the extracted time information to the decoding logic circuit 298, the time extraction circuit 297 also outputs the extracted time information to a target component 400 (which is shown in phantom in FIG. 4 as it is not part of the AES bi-phase decoder 296-1) of the broadcast router 100. There, depending on the particular functionality of the target component 400, it is contemplated that the extracted time information, extracted by the time extraction circuit of the AES bi-phase decoder 296-1, may be used for a wide variety of purposes. For example, it is contemplated that the extracted time information may be used when encoding a stream of serialized AES digital audio data. In such an example, an encoding logic circuit, which, for example, may form part of the AES output circuit 164-1, would serve as the target component 400. Of course, an encoding logic circuit is but one example of a target component of the broadcast router 100 which could use the extracted time information to perform various functions. Furthermore, it is contemplated that the extracted time information could be forwarded to plural target components, each of which would use the extracted time information during execution of a respective function. Finally, it is contemplated that the extracted time information could also be used, by the AES bi-phase decoder 296-1 itself to decode the received AES serialized digital audio data stream.

The decoding logic circuit 298 is configured to identify "X-type" preambles, "Y-type" preambles, "Z-type" preambles, logical ones and logical zeros within the AES serialized digital audio data stream. After identifying a preamble and concluding that the identified preamble is either an "X" preamble, a "Y" preamble or a "Z" preamble, the decoding logic circuit 298 transfers the identified preamble to the FIFO memory 302 which, as disclosed herein, is a 32-bit wide register.

Upon commencing the extraction of digital audio data from the received AES serialized digital audio data stream, the decoding logic circuit 298 will place the first such decoded preamble, typically, a type "Z" preamble, into bits 31-28 of the FIFO memory 302. If the decoding logic circuit 298 subsequently identifies a logical "1" or a logical "0" in the AES serialized digital audio data stream, the decoding logic circuit 298 transfers the decoded data bit into bit 31 of the FIFO memory 302, thereby causing the first decoded preamble to be moved into bits 30-27 of the FIFO memory 302. In this manner, the decoding logic circuit 298 decodes, in succession, individual bits of data in the received stream of serialized AES digital audio data, and identifies each such bit as either a logical "1", a logical "0" or as part of a preamble. As each data bit is successfully identified, it is transferred into bit 31 of the FIFO 302, thereby gradually filling the FIFO 302 with a first 32-bit subframe of AES digital data. Whenever another preamble is subsequently identified, however, the decoding logic circuit 298 concludes that it has begun to decode a next 32-bit subframe of AES digital data. Accordingly, the existing contents of the FIFO 302 are clocked into the selector circuit 138-1 and the newly identified preamble is placed into bits 31-28 of the FIFO 302, thereby beginning the filling of the FIFO 302 with a next 32-bit subframe of AES digital data.

Figure 5:
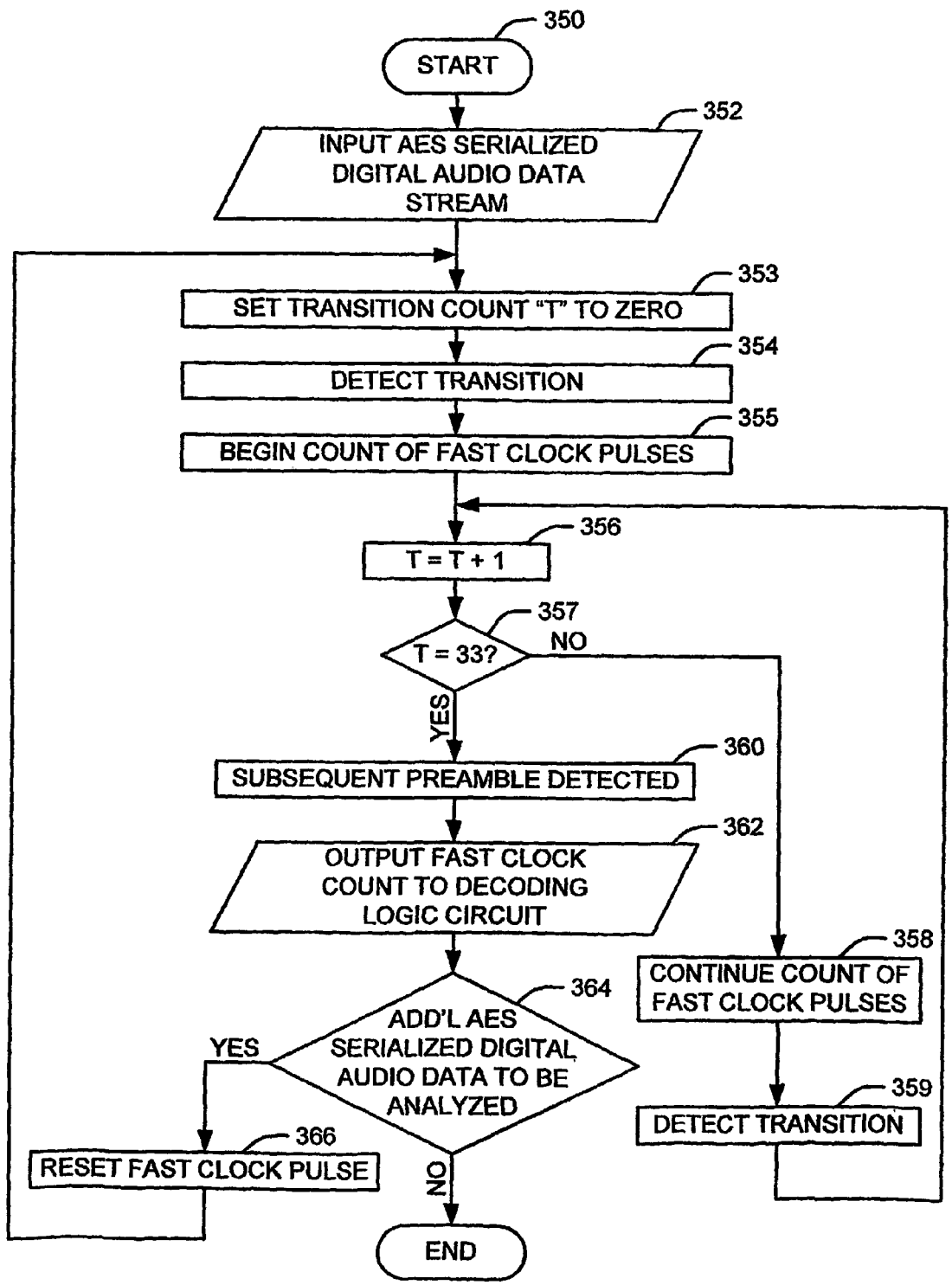
FIG. 5 is a flow chart of a method by which a time extraction circuit of the AES bi-phase decoder of FIG. 4 determines the number of fast clocks separating successive preambles of an AES-3 serial digital audio data stream.

Referring next to FIG. 5, the method by which the time extraction circuit 297 certain time information, specifically the number of fast clocks separating successive preambles, from the AES serialized digital audio data stream will now be described in greater detail. The method commences at step 350 and, at step 352, the AES serialized digital audio data stream from which the aforementioned time information is to be extracted is input the time extraction circuit 297. Continuing on to step 353, the transition count "T" is set to zero and the time extraction circuit 297 begins examining the incoming AES serialized digital audio data stream for transitions. At step 354, the time extraction circuit 297 detects a first transition in the incoming AES serialized digital audio data stream and presumes that the detected transition indicates the start of a first preamble. The method then proceeds to step 355 where the time extraction circuit 297 begins a count of the number of fast clock pulses between the detected preamble and a subsequent preamble in the incoming AES serialized digital audio data stream. To do so, the method will first proceed to step 356 where the transition count T is incremented by one.

Proceeding on to step 357, the time extraction circuit 297 then compares the transition count T to 33, the number of transitions which occur between successive preambles of AES-3 serialized digital audio data stream. If it is determined at step 357 that the transition count T is less than 33, then the time extraction circuit 297 concludes that the subsequent preamble has not yet been detected. The method then proceeds to step 358 where the count of fast clock pulses continue. Continuing on to step 359, the time extraction circuit 297 resumes its examination of the incoming AES-3 serialized digital audio data stream for a subsequent transition. Upon detection of a subsequent transition, the time extraction circuit 297 will again determine if the detected transition indicates the start of a subsequent preamble in the incoming AES-3 serialized digital audio data stream. To do so, the method returns to step 356 where the time extraction circuit 297 would again determine, in the manner previously described with respect to the first detected transition, if the subsequently detected transition is indicative of a subsequent preamble in the incoming AES-3 serialized digital audio data stream.

Returning now to step 357, if the transition count T is equal to 33, the method proceeds to step 360 where the time extraction circuit 297 concludes that the detected transition indicates the start of a subsequent preamble in the incoming AES-3 serialized digital audio data stream. The method would then proceed to step 362 where the time extraction circuit 297 transmits the fast clock pulse count to the decoding logic circuit 298 for use in decoding the AES-3 serialized digital audio data stream. Continuing on to step 364, the time extraction circuit 297 determines if there is additional AES serialized digital audio data to be analyzed. If there is additional data to be analyzed, the method proceeds to step 366 for reset of the fast clock pulse count. The method would then return to step 353 for further analysis of the incoming AES serialized digital audio data stream in the manner previously described. If, however, it is determined at step 364 that there is no additional AES serialized digital audio data requiring analysis, the method would instead end at 368.

Thus, there has been disclosed and illustrated herein a method for extracting selected time information, from a serialized stream of digital audio data passing through the broadcast router, for use by various components thereof. Of course, while preferred embodiments of this invention have been shown and described herein, various modifications and other changes can be made by one skilled in the art to which the invention pertains without departing from the spirit or teaching of this invention. Accordingly, the scope of protection is not limited to the embodiments described herein, but is only limited by the claims that follow.

The invention claimed is:

1. A method for extracting selected time information from a stream of serialized Audio Engineering Society (AES) digital audio data, comprising:
   detecting, by a broadcast router, a first transition indicative of a first preamble of said stream of serialized AES digital audio data;
   detecting, by the broadcast router, a second transition indicative of a subsequent preamble of said serialized AES digital audio data, wherein said second transition is detected by counting transitions after the first transition where said first transition and said second transition are separated by thirty-one intervening transitions, wherein said thirty-one intervening transitions are not indicative of said subsequent preamble of said serialized AES digital audio data;
   determining a clock pulse count separating said first preamble and said subsequent preamble; and
   transferring the determined clock pulse count to a decoding logic circuit for decoding said stream of serialized AES digital audio data by utilizing the determined clock pulse count.

2. The method of claim 1, wherein said determined clock pulse count is suitable for use in encoding said stream of serialized AES digital audio data.

3. The method of claim 2, and further comprising transferring said determined clock pulse count to an encoding logic circuit for use in encoding said stream of serialized AES digital audio data.

4. The method of claim 3, wherein said clock pulse count is a count of clock pulses of a fast clock.

5. The method of claim 3, wherein said first transition and said second transition are separated by thirty-one intervening transitions, wherein said thirty-one intervening transitions are not indicative of said subsequent preamble of said serialized AES digital audio data, and wherein at the thirty-second intervening transition the fast clock pulse count is determined.

6. A broadcast router comprising:
   a decoder circuit coupled to receive a stream of serialized Audio Engineering Society (AES) digital audio data, said decoder circuit extracting time information from said stream of serialized AES digital audio data during the decoding thereof wherein said time information comprises a clock pulse count separating a first transition indicative of a first preamble of said stream of serialized AES digital audio data, and a second transition indicative of a second preamble of said stream of serialized AES digital audio data, wherein said second transition is detected by counting transitions after the first transition where said first transition and said second transition are separated by thirty-one intervening transitions, wherein said thirty-one intervening transitions are not indicative of said subsequent preamble of said serialized AES digital audio data and utilizing said extracted time information to decode said received stream of serialized AES digital audio data; and a target component coupled to said decoder circuit, said target component receiving said extracted time information from said stream of serialized AES digital audio data;

wherein said target component utilizes said extracted time information while executing at least one function thereof.

7. A method for extracting selected time information from a stream of serialized Audio Engineering Society (AES) digital audio data, comprising:

detecting, by a broadcast router, a first transition of the stream of serialized AES digital audio data;

counting, by a broadcast router, a number of transitions of the serialized AES digital audio data from the first transition until the number of transition reaches a count of 33;

counting a number of clock pulses of a clock from the detecting of the first transition of the serialized AES digital audio data until the number of transitions reaches the count of 33, the clock having a higher frequency than a frequency of the transitions of the serialized AES digital audio data; and outputting the clock count to a decoding logic circuit.

8. The method of claim 7, wherein the clock is a fast clock.

* * * * *